Figure 1:
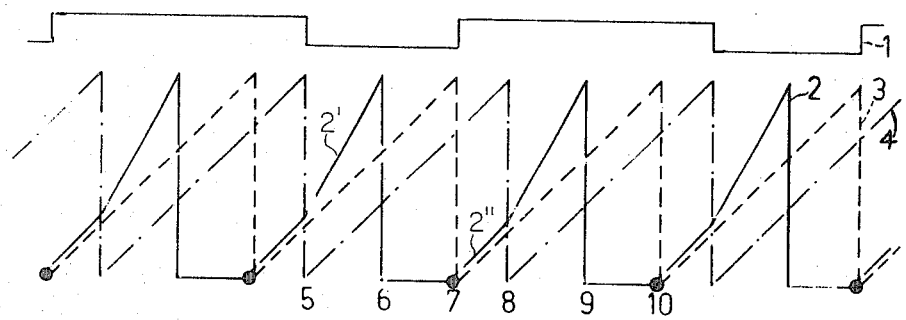

United States Patent [19]
Boersma

[11] 3,851,257
[45] Nov. 26, 1974

[54] CIRCUIT FOR DETERMINING INTERROGATION INSTANTS FOR A BIVALENT SIGNAL

[75] Inventor: Lieuwe Boersma, Beekbergen, Netherlands

[73] Assignee: U.S. Philips Corporation, New York, N.Y.

[22] Filed: Aug. 15, 1973

[21] Appl. No.: 388,396

[30] Foreign Application Priority Data
Sept. 19, 1972 Netherlands.................... 7212653

[52] U.S. Cl..................... 328/63, 307/269, 328/48, 328/179
[51] Int. Cl. ............................................ H03k 1/00
[58] Field of Search.......... 307/223 R, 269; 328/48, 328/43, 63, 179

[56] References Cited
UNITED STATES PATENTS
3,544,907  12/1970  Bleickardt............................ 328/63

Primary Examiner—Stanley D. Miller, Jr.
Attorney, Agent, or Firm—Frank R. Trifari

[57] ABSTRACT

The circuit for determining interrogation instants comprises an integrating circuit which is started by a first trigger signal and supplied by clock pulses at a first integrating speed and is switched over by a second trigger signal to a speed which is twice as high as the first speed. When the integration of the clock pulses reaches a given level, an interrogation output pulse is generated. The first and second trigger signals are supplied by delay circuits which are started at relevant transitions between levels of the bivalent signal and which have a delay time which corresponds to the length of a standard segment of the bivalent signal.

5 Claims, 2 Drawing Figures

CIRCUIT FOR DETERMINING INTERROGATION INSTANTS FOR A BIVALENT SIGNAL

The invention relates to a unit for determining interrogation instants for a signal having a substantially regular series of pulses.

A unit of this kind is known from Netherlands Pat. application No. 6,403,543 for use in the determination of the centers of black character elements in reading machines. The single and the double integrating speed are started at successive transition instants. This unit has the drawback that, if the centers of the white intermediate spaces must also be determined, a second unit of this kind is required. The unit according to the invention eliminates this drawback because it is characterized in that two delay elements are provided which can be activated from their starting position by signals of transitions of a first and a second polarity, respectively, output signals of said delay elements being capable of controlling said first and second integrating speed. The integrating unit can thus be active at one integrating speed, while the information of a recent transition instant is retained by a delay element, with the result that the other integrating speed will be started in due time.

According to one aspect of the invention, the delay times of the delay elements which can be actuated by alternating transitions are substantially equal to the intervals between successive interrogation instants. A simple operation is thus achieved.

In accordance with a further aspect of the invention, the clock pulses of a clock can be continuously counted by the delay elements which are constructed as ring counters. Consequently, the unit is hardly susceptible to interference, and interrogation instants are continuously and regularly generated, even if there are temporarily no transitions as may occur with specific signal codes. Correction can thus also be readily effected.

It is a further advantageous aspect of the invention that the integrating unit is a main counter which can be driven by the clock. Consequently, upon variation of the intervals between the transition instants, the intervals between the interrogation instants can be very readily adapted thereto, i.e. by way of a different clock pulse frequency.

Figure 2:
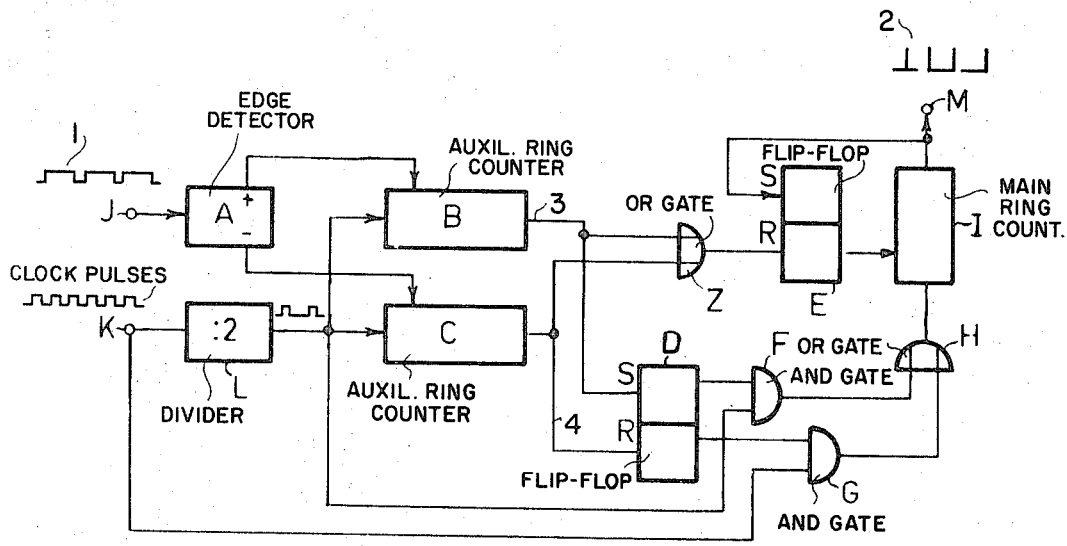

The invention will be described in detail hereinafter with reference to FIG. 1 which shows time diagrams of the signal to be interrogated, in relation to the actuation of respective counting positions or stages of ring counters B,C and I as shown in FIG. 2; and FIG. 2 which shows an embodiment of a unit according to the invention.

FIG. 2 shows a circuit comprising a signal input terminal J, an edge detector A, two auxiliary ring counters B and C, two bistable elements D and E, two logic AND-gates F and G, two logic OR-gates H and Z, one main ring counter I, a clock pulse input terminal K, a two-divider L, and an interrogation signal output terminal M. FIG. 1 shows, as a function of time, the input signal on terminal J (curve 1), the acutation of successive counting positions or stages of main counter I (curve 2), of the auxiliary counter B (curve 3), and of the auxiliary counter C (curve 4).

At the instant 5 the edge detector A detects a negative edge of the signal terminal J and supplies a trigger pulse to the output denoted by "−". This pulse can be used for synchronizing or triggering the auxiliary counter C. If the auxiliary counter had not yet reached its highest position so that it is still in a comparatively high position, the counter C can be accelerated in the same manner by adding one or more clock pulses in known manner. The counter C further counts the pulses from the two-divider L which receives pulses from terminal K of a clock not shown.

At the instant at which the counter C reaches its highest counting position, it is switched or reset to the lowest or starting position by the next clock pulse, and supplies a delayed trigger pulse to the input R of the bistable element D, with the result that the output which is connected at this instant to the logic AND-gate G becomes high. The gate G then allows passage of the clock pulses from terminal K. At the same time the bistable element E receives a pulse, via the logic OR-gate Z, on its input R, with the result that the output which is connected to the main counter I becomes high so that the main counter I is unblocked (or remains so) for the pulses arriving via the logic OR-gate H. The counter I then counts the clock pulses from terminal K at full speed: the curve 2 has a steep slope 2' after the instant 5.

At the instant 6 the main counter I reaches its highest or reset position, with the result that the resetting pulse appears as an interrogation signal on the terminal M and, moreover, the bistable element E is reset by the interrogation pulse on its input S. Due to the connection of the bistable element E to the main counter I, the latter is blocked for the clock pulses during the time interval between instants 6 and 7.

At the instant 7 the edge detector A detects a positive going edge of the signal on terminal J, and supplies a second trigger signal to its output "+". This pulse can be used for synchronizing or triggering the auxiliary counter B in the same manner as described for the auxiliary counter C. At the instant 7 at which the counter B reaches its highest or reset position and is set to its lowest or starting position by the next divided clock pulse, it applies a delayed trigger pulse to the input S of the bistable element D, with the result that the output which is connected at this instant 7 to the logic AND-gate F becomes high. The gate F (and no longer the gate G) then allows passage of divided clock pulses arriving on the gate F from the two-divider L.

At the same time the bistable element E receives a pulse, via the logic OR-gate Z, on its input R, with the result that its output which is connected to the main counter I becomes high and the counter I is unblocked. Consequently, after the instant 7, the sloping part 2" of curve 2 in FIG. 1 has a lower gradient.

At the instant 8 counter C reaches its highest or reset position and applies a pulse to the input R of the bistable element D, with the result that gate G is opened and gate F is blocked for clock pulses: after this instant the slope of curve 2 is steeper again. At the instant 9 the main counter I has been filled and reaches its highest position, with the result that, as already described, an interrogation signal appears on terminal M and the main counter is further blocked for clock pulses. At the instant 10 counter B reaches its highest position. As a result, the main counter I is unblocked again via the OR gate Z and the bistable element E, and the logic AND-gate F is opened for the clock pulses via the bistable element D: the curve 2 of FIG. 1 then has the low slope again.

The counters B, C and I can be constructed as ring counters which continuously count down input pulses and are periodically reset upon reaching their highest counting position; they can all have, for example, a capacity of 32 counting positions. Consequently, interrogation pulses are continuously generated, even if no transistions occur for some time. This can be caused by the absence of input information or because the coding of the input information suppresses some transitions.

An advantage of the described embodiment is that in the case of very severe distortion, i.e. if in the described case the intervals between successive transitions, relating according to standard as 1 : 1, relate as 1 : 3 (or more), the unit considers this as the absence of the short segments; in such a case only the long segments are interrogated. This is advantageous if the coding suppresses transitions: the unit then always considers the smallest possible distortion, which is also most likely. Larger distortions are then caused by the code. This case may occur, for example, with a pattern giving alternately one high and two low bits.

What is claimed is:

1. A circuit for determining interrogation instants for a bivalent signal, comprising means for producing a first trigger pulse in response to a negative goining portion and, subsequently, a second trigger pulse in response to a positive going portion of the signal, two delay units operable for delaying each trigger pulse for a predetermined time interval, a source of clock pulses, a dividing unit for reducing the frequency of said clock pulses by a predetermined number, main integrating unit triggered by one delayed trigger pulse and operable for producing an interrogation output pulse upon attaining a predetermined integration level, and switching means controlled by the delayed trigger pulses for supplying said integrating unit with pulses from said dividing unit in response to said one delayed trigger pulse and, subsequently, with pulses from said source in response to the other delayed trigger pulse.

2. A circuit as claimed in claim 1 wherein said delay units are auxiliary integrating units connected to the output of said dividing unit and operable for producing auxiliary output pulses when reaching, respectively, a predetermined integration level, one auxiliary unit being triggered by said first trigger pulse and the other by said second trigger pulse.

3. A circuit as claimed in claim 2 wherein said switching means includes a flip-flop circuit controlled by said auxiliary output pulses, a first "AND" gate having one input connected to the output of one stage of said flip-flop and a second input connected to said source of clock pulses, and an "OR" gate having one input connected to the output of said first "AND" gate, a second input connected to the output of said second "AND" gate and an output connected to the input of said main integrating unit.

4. A circuit as claimed in claim 2 further including an "OR" gate having inputs connected to respective outputs of said auxiliary integrating units, a flip-flop circuit having one stage controlled by the output of said "OR" gate to trigger said main integrating unit when switched-on, and the other stage controlled by the output of said main integrating unit.

5. A circuit as claimed in claim 2 wherein said integrating units are ring counters.

* * * * *